US007634405B2

(12) United States Patent
Basu et al.

(10) Patent No.: US 7,634,405 B2
(45) Date of Patent: Dec. 15, 2009

(54) PALETTE-BASED CLASSIFYING AND SYNTHESIZING OF AUDITORY INFORMATION

(75) Inventors: Sumit Basu, Seattle, WA (US); Nebojsa Jojic, Redmond, WA (US); Ashish Kapoor, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 669 days.

(21) Appl. No.: 11/041,827

(22) Filed: Jan. 24, 2005

(65) Prior Publication Data

US 2006/0167692 A1 Jul. 27, 2006

(51) Int. Cl.
*G10L 15/06* (2006.01)
*G10L 15/00* (2006.01)
*G10L 17/00* (2006.01)
*G10L 13/00* (2006.01)

(52) U.S. Cl. ....................... 704/243; 704/245; 704/239; 704/250; 704/258

(58) Field of Classification Search ................. 704/255, 704/235, 221, 231, 245, 256.7, 239, 243, 704/258
See application file for complete search history.

(56) References Cited

U.S. PATENT DOCUMENTS 6,064,958 A * 5/2000 Takahashi et al. ........... 704/243
6,535,851 B1 * 3/2003 Fanty et al. ................. 704/249
6,718,306 B1 * 4/2004 Satoh et al. ................. 704/246
6,990,453 B2 * 1/2006 Wang et al. ................. 704/270
7,319,964 B1 * 1/2008 Huang et al. ................ 704/278
2003/0112265 A1 * 6/2003 Zhang ........................ 345/723
2004/0002931 A1 * 1/2004 Platt et al. ...................... 706/46
2004/0122672 A1 * 6/2004 Bonastre et al. ............. 704/256
2004/0181408 A1 * 9/2004 Acero et al. ................ 704/255
2005/0102135 A1 * 5/2005 Goronzy et al. ............. 704/213
2005/0131688 A1 * 6/2005 Goronzy et al. ............. 704/240
2005/0160449 A1 * 7/2005 Goronzy et al. ................ 725/5
2006/0020958 A1 * 1/2006 Allamanche et al. .......... 725/19

OTHER PUBLICATIONS

Perry et al. "Belief function divergence as a classifier" WL Perry, HE Stephanou—Intelligent Control, 1991., Proceedings of the 1991 IEEE.*
Lu, L., Zhang, H. and Jiang, H. (2002) "Content Analysis for Audio Classification and Segmentation". IEEE Transactions on Speech and Audio Processing, 10 (7). 504-516.*

(Continued)

*Primary Examiner*—David R Hudspeth
*Assistant Examiner*—Edgar Guerra-Erazo
(74) *Attorney, Agent, or Firm*—Lee & Hayes, PLLC

(57) ABSTRACT

The subject invention leverages spectral "palettes" or representations of an input sequence to provide recognition and/or synthesizing of a class of data. The class can include, but is not limited to, individual events, distributions of events, and/or environments relating to the input sequence. The representations are compressed versions of the data that utilize a substantially smaller amount of system resources to store and/or manipulate. Segments of the palettes are employed to facilitate in reconstruction of an event occurring in the input sequence. This provides an efficient means to recognize events, even when they occur in complex environments. The palettes themselves are constructed or "trained" utilizing any number of data compression techniques such as, for example, epitomes, vector quantization, and/or Huffman codes and the like.

16 Claims, 16 Drawing Sheets

OTHER PUBLICATIONS

B.J. Frey and N. Jojic. Learning the 'epitome' of an image. Technical Report PSI-2002- 14, University of Toronto Technical Report, 2002.*

EIC_Search_Report_NPL.*

A. Kapoor and S. Basu. The audio Epitome: a new representation for modleing and classifying auditory phenomena. In Proceedings of the International Conference on Acoustics, Speech, and Signal Processing (ICASSP), 2005.*

M. A. Casey, Reduced-Rank Spectra and Minimum-Entropy Priors as Consistent and Reliable Cues for Generalized Sound Recognition, Workshop for Consistent and Reliable Cues 2001, Aalborg, Denmark.

G. Guo, et al., Content-Based Audio Classification, IEEE Transactions on Neural Networks, vol. 14 (1), Jan. 2003.

N. Jojic, et al., Epitomic Analysis of Appearance and Shape, Proceedings of International Conference on Computer Vision 2003, Nice, France.

M. J. Reyes-Gomez, et al., Selection, Parameter Estimation and Discriminative Training of Hidden Markov Models for General Audio Modeling, Proceedings of International Conference on Multimedia and Expo 2003, Baltimore, USA.

T. Zhang, et al., Heuristic Approach for Generic Audio Data Segmentation and Annotation, Proceedings of ACM International Conference on Multimedia 1999, Orlando, USA.

* cited by examiner

600

1000

PALETTE-BASED CLASSIFYING AND SYNTHESIZING OF AUDITORY INFORMATION

TECHNICAL FIELD

The subject invention relates generally to data recognition, and more particularly to systems and methods utilizing a palette-based classifier and synthesizer for auditory events and environments.

BACKGROUND OF THE INVENTION

There are many scenarios where being able to recognize audio environments and/or events can prove to be especially beneficial. This is because audio often provides a common thread that ties other sensory events together. Being able to exploit this audio characteristic would allow for products and services that can facilitate such things as security, surveillance, audio indexing and browsing, context awareness, video indexing, games, interactive environments, and movies and the like.

For example, workloads for security personnel can be lessened by reducing demands that would otherwise overwhelm a worker. Consider a security guard who must watch 16 monitors at a time, but does not monitor the audio because listening to the 16 audio streams would be impossible and/or might violate privacy. If sound events like footsteps, doors opening, and voices and the like can be recognized, they could be shown visually along with the video to enable the worker to have a better sense of what's going on at each location watched by the 16 monitors. Likewise, surveillance could be enhanced by distinguishing between sound events. For example, baby monitors are currently triggered by sound energy alone, creating false alarms for worried parents. If a monitor could differentiate between crying, gurgling, lightning, and footsteps and the like and trigger a baby alarm only when necessary, this would increase the safety of the baby through a much more reliable monitoring system, easing parents' concerns.

Sometimes because an audio recording is extremely long and contains a lot of information, it is very time consuming for an audio editor to review it. Current technology often just displays an audio waveform on a timeline, making it very difficult to browse visually to a desired spot in the recording. If it were possible to recognize and label different events (e.g., voices, music, cars, etc.) and environments (e.g., café, office, street, mall, etc.), it would be far easier to browse through the recording visually and find a desired spot to review. This would save both time and money for a business that provided such editing services.

Occasionally, it is also beneficial to be able to easily discern what type of environment a device is currently located in. With this type of "contextual awareness," the device could adjust parameters to compensate for such things as noise levels (e.g., noisy, quiet), and/or appropriateness (e.g., church, funeral) for a particular action and the like. For example, the loudness of a cell phone ring could be adapted to respond based on whether a user was in a café, office, and/or lecture hall and the like.

It is also desirable to be able to synthesize auditory environments effectively with high accuracy. A film sound engineer might want to recreate an office meeting environment to utilize in a new film. If the engineer can create or synthesize an office environment, a discussion on a multi-million dollar controversial condominium development can be dubbed onto the recording so that the audience believes the conversation takes place in an office. As another example of environmental interest, a recording of the 'great outdoors' can be made. The recording might have the sweet sound of bird chirps and morning crickets. Parts of the environmental sounds could be synthesized into a gaming environment for children. Thus, sound synthesizing is highly desirable for interactive environments, games, and movies and the like.

Video indexing is also an area that could benefit substantially by recognizing auditory events and environments. There are a variety of current techniques that break a video up into shots, but often the visual scene changes drastically as a camera pans from, for example, a café to a window, and the techniques incorrectly create a new shot. However, during the panning, oftentimes the audio remains similar. Thus, if an auditory environment could be reliably recognized as being similar, it could be determined that a visual scene has not changed. Additionally, this would allow the ability to retrieve particular kinds of scenes (e.g., all beach scenes) which are very similar in terms of auditory environments (e.g., same types of beach sounds), though quite different visually (e.g., different weather, backgrounds, people, etc.).

Thus, being able to efficiently and reliably recognize auditory events and environments is extremely desirable. Techniques that could accomplish this could benefit a wide range of products and industries, even those that are not typically thought of as being driven by audio related functions, easing workloads, increasing safety, increasing customer satisfaction, and allowing products that would not otherwise be possible. It would even be able to enhance and extend an existing product's usefulness and flexibility.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates generally to data recognition, and more particularly to systems and methods utilizing a palette-based classifier and/or synthesizer. Optimal spectral "palettes" or representations of an input sequence are leveraged to provide recognition of a class of data. The class can include, but is not limited to, individual events, distributions of events, and/or environments relating to the input sequence. Generally speaking, the representations are compressed versions of the data that utilize a substantially smaller amount of system resources to store and/or manipulate. Segments of the palettes are employed to facilitate in reconstruction of an event occurring in the input sequence. This provides an efficient means to recognize events, even when they occur in complex environments. The palettes themselves are constructed or "trained" utilizing any number of data compression techniques such as, for example, epitomes, vector quantization, and/or Huffman codes and the like.

Instances of the subject invention represent scales of classes in terms of a distribution of events which are, in turn, learned over a representation that attempts to capture events in an environment. In one instance of the present invention, the "events" are sounds, and the input sequence is comprised of an auditory environment. A representation of this instance of the subject invention can include, for example, an audio epitome. An audio epitome can contain elements of a variety of timescales that it finds appropriate to best represent what it observed in an audio input sequence. The epitome is, in other words, a continuous 'alphabet' that represents the space of sounds in an environment. Models of target classes can then be constructed in terms of this alphabet and utilized to classify audio events. The subject invention significantly enhances the recognition of audio events, distributed audio events, and/or environments while utilizing less system resources.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
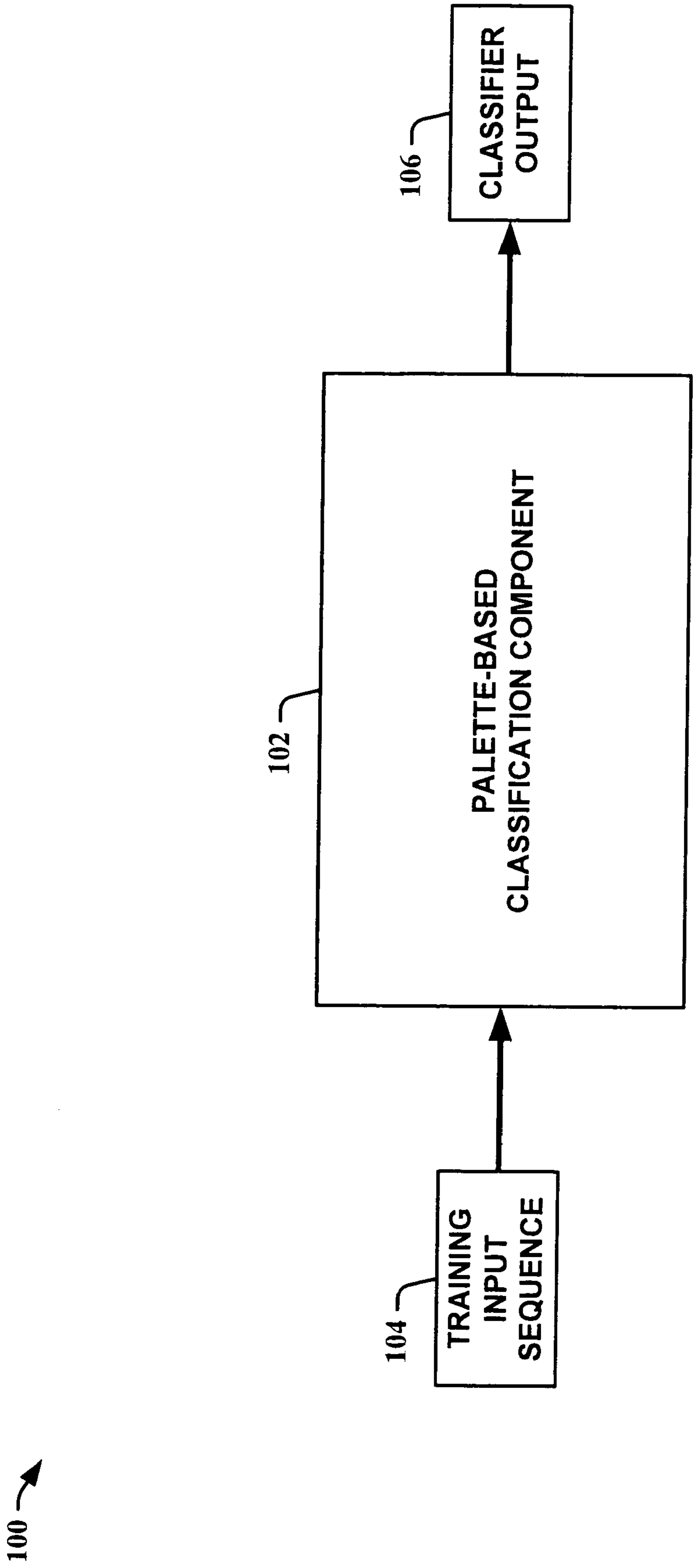
FIG. 1 is a block diagram of a palette-based classification system in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The subject invention provides systems and methods that utilize palette-based classifiers to recognize classes of data. Other instances of the subject invention can also be utilized to synthesize classes based on a palette. Some instances of the subject invention provide a representation for auditory environments that can be utilized for classifying events of interest, such as speech, cars, etc., and to classify the environments themselves. One instance of the subject invention utilizes a novel discriminative framework that is based, for example, on an audio epitome—a novel extension in the audio realm of an image representation developed by N. Jojic, B. Frey and A. Kannan, "Epitomic Analysis of Appearance and Shape," *Proceedings of International Conference on Computer Vision* 2003, Nice, France. Another instance of the subject invention utilizes an informative patch sampling procedure to train the epitomes. This technique reduces the computational complexity and increases the quality of the epitome. For classification, the training data is utilized to learn distributions over the epitomes to model the different classes; the distributions for new inputs are then compared to these models. On a task of distinguishing between four auditory classes in the context of environmental sounds (e.g., car, speech, birds, utensils), instances of the subject invention outperforms the conventional approaches of nearest neighbor and mixture of Gaussians on three out of the four classes.

Instances of the subject invention are useful in a number of different areas. On the recognition side, they can be utilized for recognizing different sounds (for office awareness, user monitoring, interfaces, etc.), for recognizing the user's location via recognizing auditory environments and for finding "scene" boundaries and/or clustering scenes in audio or audio/video data (e.g., clustering all beach scenes together and finding their boundaries because they sound similar to each other but not other scenes). On the synthesis side, it can be utilized for generating audio environments for games (instead of having to model individual sound sources for a café, as is typical today, the sound of a café with all its component sounds could be generated by this method), for making an audio summary of a long recording by playing component and backgrounds sounds, and/or for acting as a sound background for presentations or slideshows (e.g., imagine ambient sounds of the beach playing when viewing pictures of the beach).

In FIG. 1, a block diagram of a palette-based classification system 100 in accordance with an aspect of the subject invention is shown. The palette-based classification system 100 is comprised of a palette-based classification component 102 that receives a training input sequence 104 and provides a classifier output 106. The training input sequence 104 can be comprised of various types of data. A common example utilized supra is that of an auditory input sequence. Thus, for example, the training input sequence 104 can be a recording of an audio environment such as that found at a sidewalk café and the like. The palette-based classification component 102 reduces it 104 to a compressed representation or palette. The palette-based classification component 102 then utilizes the palette to construct a model or classifier output 106 that can be utilized to recognize other data.

Figure 2:
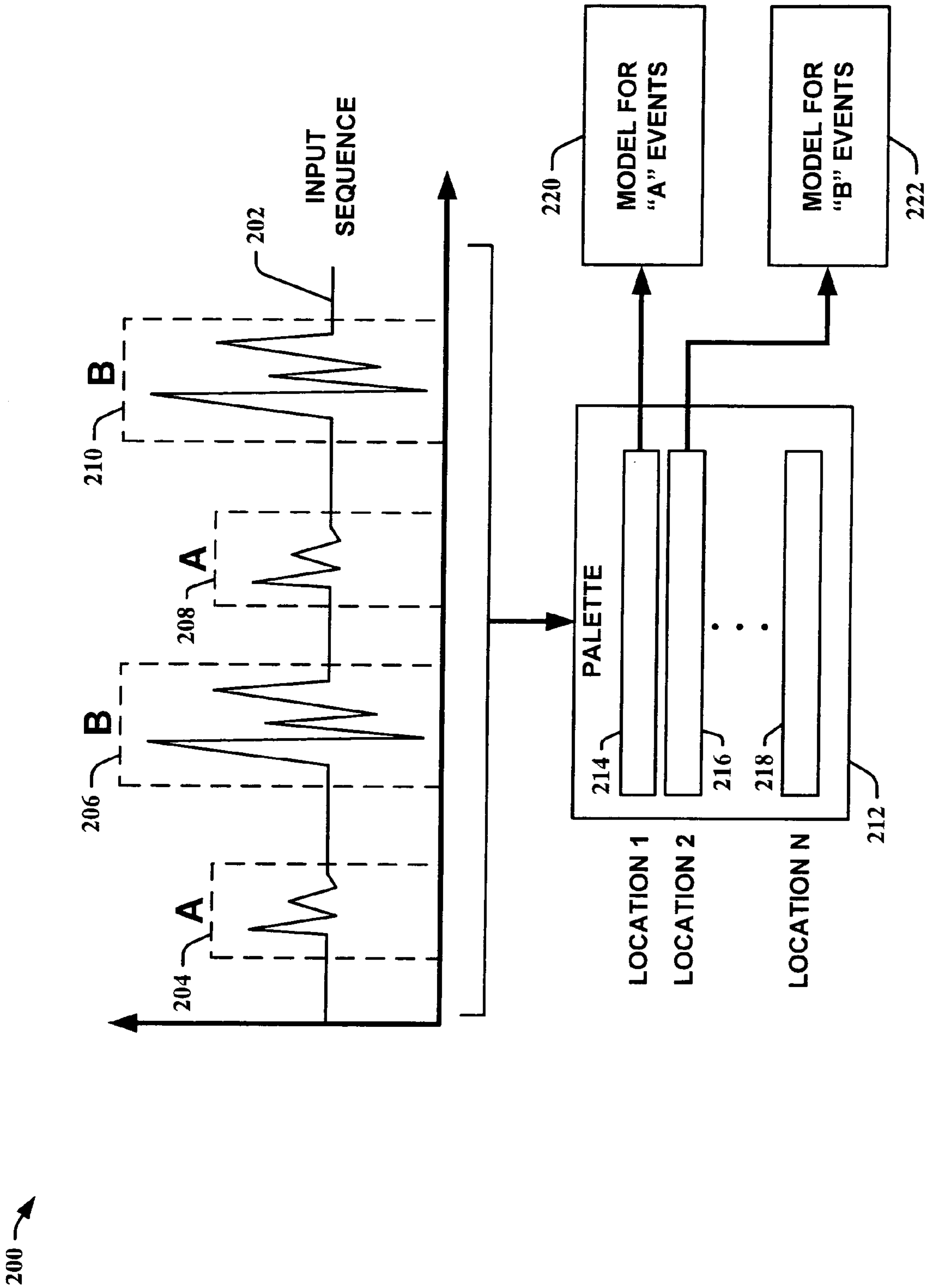
FIG. 2 is an illustration of data flow for a palette-based classification system in accordance with an aspect of the subject invention.

Turning to FIG. 2, an illustration of data flow 200 for a palette-based classification system in accordance with an aspect of the subject invention is depicted. The data flow 200 starts with obtaining an input signal 202 that, for this example, has two sets of "events," A 204, 208 and B 206, 210, that occur within the data of the input sequence 202. The input sequence 202 is processed into a palette 212 or compressed representation of the input sequence 202. This process occurs without regard for the specific events found within the input sequence 202. Thus, the compression is an attempted representation of all events within the input sequence 202. Techniques utilized for this process are described in detail infra and include, but are not limited to, epitome techniques, vector quantization techniques, and/or Huffman coding techniques and the like. Informative sampling of the input sequence 202 can also be utilized to facilitate the process. Locations 1-N 214-218 (where N represents an integer from one to infinity) can contain compressed data representations that represent events A 204, 208 and B 206, 210. "A" and "B" are meant to indicate data events that are substantially similar within the input sequence 202. In this example, the "A" events 204, 208 happen to be compressed into Location 1, 214, and the "B" events 206, 210 happen to be compressed into Location 2, 216. By processing the trained palette 212, specific locations within the palette 202 can be identified that correspond to the "A" events 204, 208 and the "B" events 206, 210. These locations 214, 216 can be utilized to construct a classifier or a model for "A" events 220 and a model for "B" events 222. Thus, the models 220, 222 are constructed from the palette which is a representation of the input sequence. The models 220, 222 can be utilized to determine class identification of events from additional data. The Locations 1-N 214-218 can also be utilized to synthesize new data by selecting desired locations within the palette 212 to construct a new data sequence.

The palette can be of a continuous form as well such as, for example, an epitome-based palette. This allows locations or "patches" of arbitrary size to be extracted from the palette. In this manner, other instances of the subject invention can be utilized to facilitate in constructing new patches that are comprised of, for example, multiple locations within the palette. Thus, for example, location 1 214 and location 2 216 can be utilized to form another model that encompasses both "A" events and "B" events. One skilled in the art can appreciate that a palette can also contain discrete and continuous portions, as opposed to being solely discrete or solely continuous.

Figure 3:
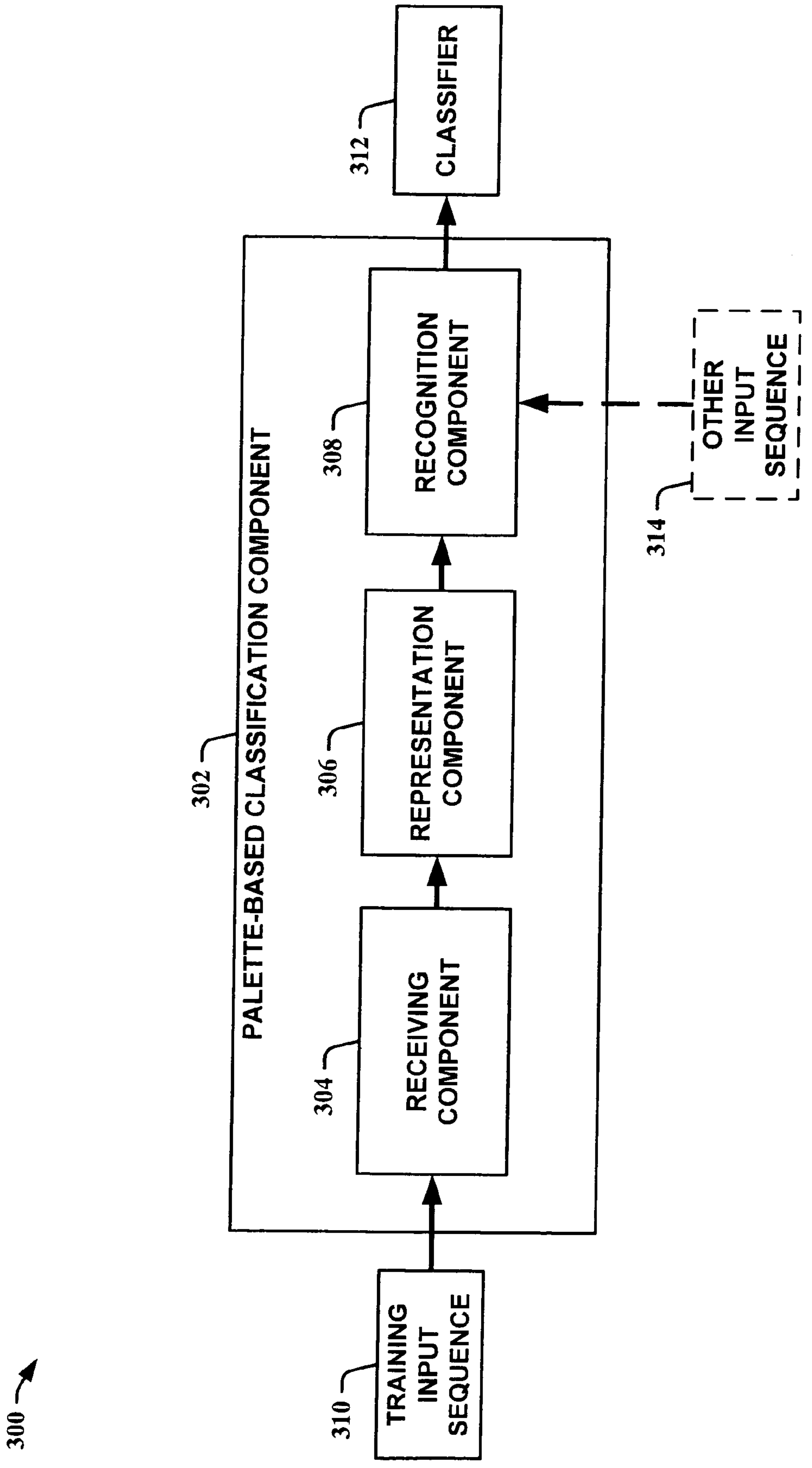
FIG. 3 is another block diagram of a palette-based classification system in accordance with an aspect of the subject invention.

Referring to FIG. 3, another block diagram of a palette-based classification system 300 in accordance with an aspect of the subject invention is illustrated. The palette-based classification system 300 is comprised of a palette-based classification component 302. The component 302 is further comprised of a receiving component 304, a representation component 306, and a recognition component 308. A training input sequence 310 is received by the receiving component 304 which relays the data to the representation component 306. The representation component 306 constructs a palette based on the training input sequence 310. The representation component 306 can employ a variety of techniques to form the palette such as, for example, epitome, vector quantization, and Huffman coding techniques and the like. Informative sampling and other techniques can also be utilized to facilitate training the palette. The recognition component 308 then isolates events that it is interested in from the training input sequence 310 and identifies locations within the palette that represent those events. Those locations of the palette are then utilized to create a classifier 312 for those specific events. In some instances of the subject invention, the recognition component 308 provides classifiers without retraining the palette. Thus, for example, with an epitome-based palette, the recognition component 308 can directly accept an input sequence 314 (as noted by an optional dashed box and input line in FIG. 3). It 308 then utilizes the input 314 to create the classifier 312 utilizing the palette previously generated by the representation component 306.

Figure 4:
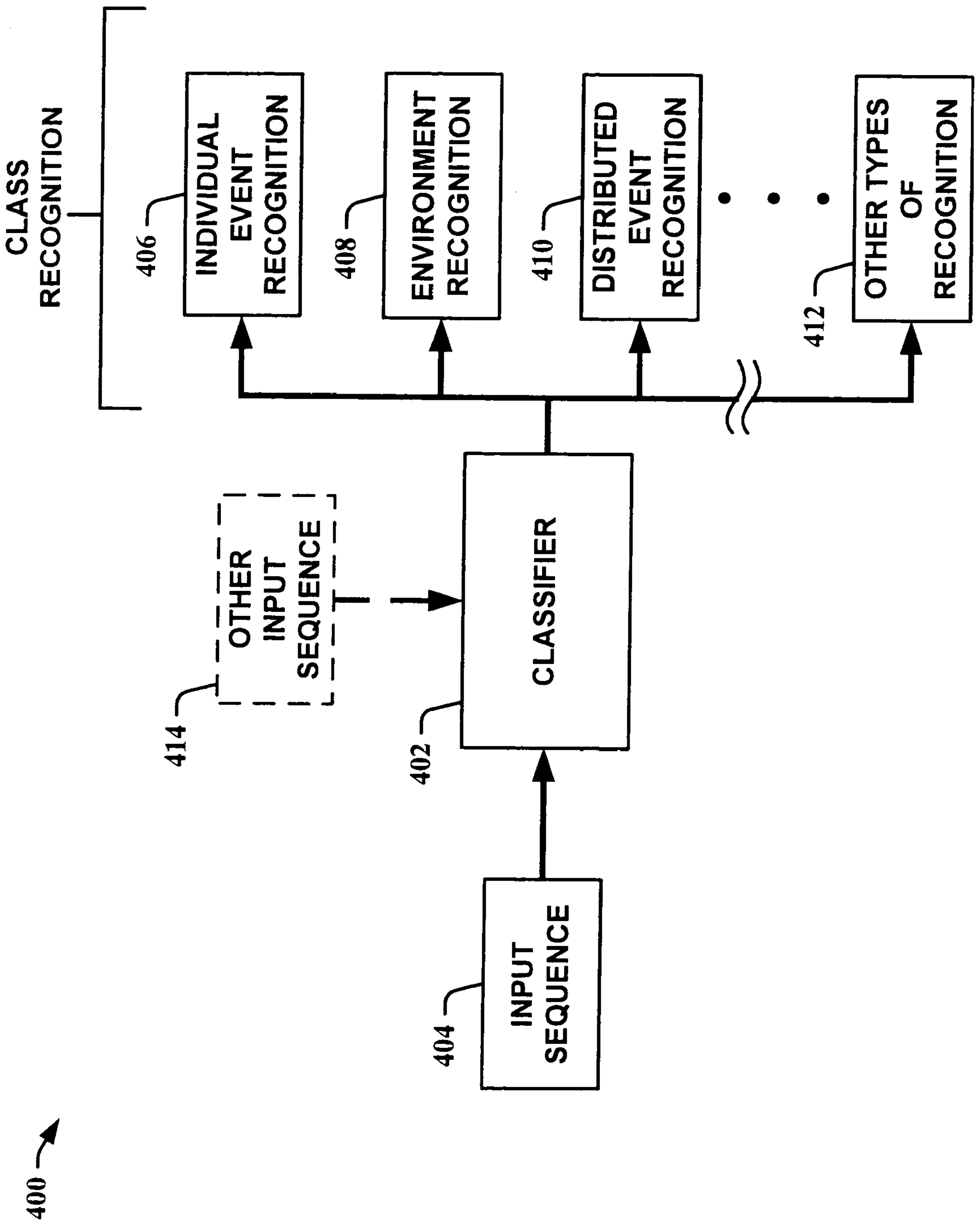
FIG. 4 is an illustration of classifier output data in accordance with an aspect of the subject invention.

Looking at FIG. 4, an illustration 400 of classifier output data in accordance with an aspect of the subject invention is shown. This illustration 400 shows the types of class recognition 406-412 that can be performed by a classifier 402 constructed by an instance of the subject invention from an input sequence 404. Thus, a "class" recognition can include, but is not limited to, an individual event recognition 406 such as, for example, a dog bark, an environment recognition 408 such as, for example, a sidewalk café atmosphere, a distributed event recognition 410 such as, a grouping of individual events that might indicate a certain activity and the like, and other types of recognition 412 which is representative of any additional recognition variations that a classifier can recognize. Thus, instances of the subject invention provide classifiers that are extremely flexible in their functionality. In other instances of the subject invention, the classifier 402 can be constructed from the same palette that was trained from the input sequence 404 but utilizing another input sequence 414. This allows the palette, such as, for example, an epitome-based palette, to be re-utilized to construct different classifiers based on different input sequences without retraining the palette.

Additionally, instances of the subject invention provide systems and methods for recognizing general sound classes and/or auditory environments; they can also be utilized for synthesizing the classes and objects. For example, for sound classes, this technique could be utilized to recognize breaking glass, telephone rings, birds, cars passing by, footsteps, etc. For auditory environments, it can be utilized to recognize the sound of a café, outdoors, an office building, a particular room, etc. Both scales of such auditory classes are represented in terms of a distribution of sounds, which is in turn learned over a representation that attempts to capture all sounds in the environment. In addition, a model can be utilized to synthesize sound classes and environments by pasting together pieces of sound from a training database that match the desired statistics.

There have been a variety of different approaches to recognizing audio classes and classifying auditory scenes. Most of the sound recognition work has focused on particular classes such as speech detection, and the best methods involve specialized methods and features that take advantage of the target class. For example, T. Zhang, C. and C. J. Kuo, Heuristic Approach for Audio Data Segmentation and Annotation, *Proceedings of ACM International Conference on Multimedia* 1999, Orlando, USA, have described heuristics for audio data annotation. The heuristics they have chosen are highly dependent on the target classes, thus their approach cannot be extended to incorporate other more general classes. There have been discriminative approaches such as in G. Guo and S. Z. Li, "Content-Based Audio Classification," *IEEE Transactions on Neural Networks*, Vol. 14 (1), January 2003, where support vector machines were utilized for general audio segmentation and retrieval. This approach is promising but is restricted in the sense that you need to know the exact classes of sounds that you want to detect/recognize in advance at the time of training.

Similarly, there are approaches based on HMMs [for example, see: (M. A. Casey, Reduced-Rank Spectra and Minimum-Entropy Priors as Consistent and Reliable Cues for Generalized Sound Recognition, *Workshop for Consistent and Reliable Cues* 2001, Aalborg, Denmark.) and (M. J. Reyes-Gomez and D. P. W. Ellis, Selection, Parameter Estimation and Discriminative Training of Hidden Markov Models for General Audio Modeling, *Proceedings of International Conference on Multimedia and Expo* 2003, Baltimore, USA)]. These approaches suffer from the same problem of spending all their resources in modeling the target classes (assumed to be known beforehand), thus extending these systems to a new class is not trivial. Finally, these methods were tested on databases where the sounds appeared in isolation, which is not a valid model of real-world situations.

In contrast, the subject invention provides instances that overcome some of these limitations since a representation is learned of all sounds in the environment at once with, for example, the epitome and then classifiers are trained based on this representation. Other instances of the subject invention provide new representations and systems/methods for auditory perception that can cover a broad range of tasks, from classifying and segmenting sound objects, to representing and classifying auditory environments. One instance of a representation is an epitome, a model introduced by Jojic et al. for the image domain. The basic idea of Jojic et al. is to find an optimal "palette" from which patches of various sizes could be drawn in order to reconstruct a full image. Instances of the subject invention apply this technique to the log spectrogram and log melgram with one-dimensional patches and find an optimal spectral palette from which pieces are taken to explain the input sequence. Thus, in one instance of the subject invention, an epitome has sound elements of a variety of timescales that it finds most appropriate to represent what it observed in the input sequence. For example, if the input contained the relatively long sounds of cars passing by and also some impulsive sounds, like car doors opening and closing, these are both to be stored as chunks of sound in the same epitome—without having to change the model parameters or training procedure.

Furthermore, the epitome is learned without specifying the target patterns to be classified and attempts to learn a model of all representative sounds in the environment. To aid in this process, a new training procedure is provided by instances of the subject invention for the epitome that efficiently allows it to maximize the epitome's coverage of the different sounds. Once the epitome has been trained, distributions over the epitome are learned for each target class, which can also be applied to entire auditory environments. In other words, the epitome is treated as a continuous "alphabet" that represents the space of all possible sounds, and models of the target classes are constructed in terms of this alphabet. New patches are then classified and segmentation is done based on these models. The approach utilized by instances of the subject invention can be divided into two parts (utilizing as an example an epitome): first, learning the audio epitome itself, and second, utilizing the epitome to build classifiers; both are elaborated on infra.

Figure 5:
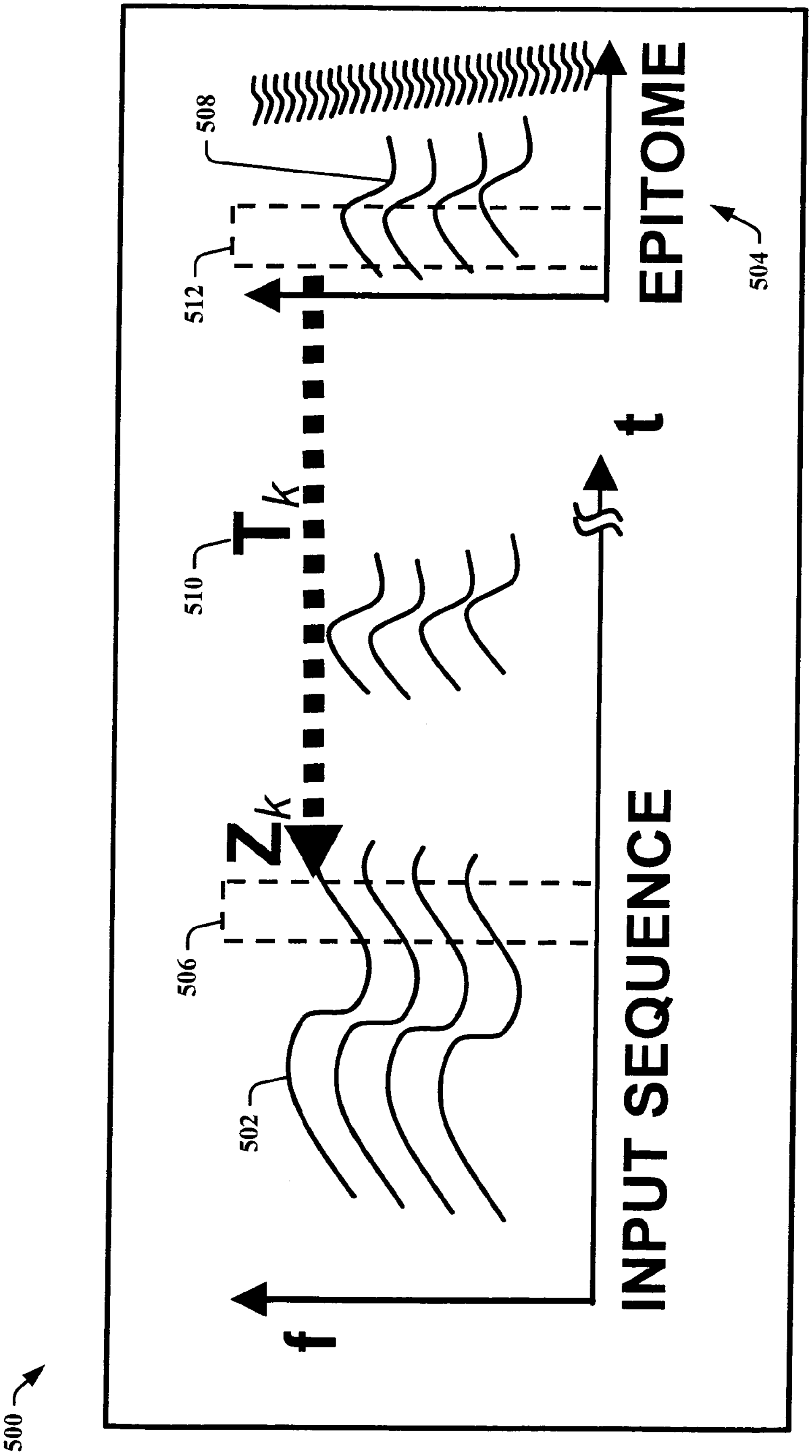
FIG. 5 is an illustration of an audio epitome representation in accordance with an aspect of the subject invention.

In FIG. 5, an illustration of an audio epitome representation 500 in accordance with an aspect of the subject invention is illustrated. The basic principle of the audio epitome is shown: an input sequence 502 is a log magnitude spectrogram, and an epitome 504 is a "palette" for such spectrograms. Observed patches 506 in the input sequence, $Z_k$, are explained by selecting a patch from the epitome e 508 with the appropriate transformation 510 (i.e., offset) $T_k$, i.e., where in the epitome 504 the patch 512 comes from. The probability of observing $Z_k$ given this epitome 504 and offset 510 is a product of Gaussians over pixels as below:

$$P(Z_k|T_k, e) = \prod_{i \in S_k} N(z_{i,k}; \mu_{T_k(i)}, \phi_{T_k(i)}) \qquad \text{(Eq. 1)}$$

where the i's are for the iteration over the individual frequency-time values or "pixels" of the spectrogram. Jojic et al. describe the mechanisms by which to learn this epitome from an input sequence and to do inference, i.e., to find $P(T_k|Z_k,e)$ from an input patch.

The training procedure requires first selecting a fixed number of patches from random positions in the image. Each patch is then averaged in to all possible offsets $T_k$ in the epitome, but weighted by how well it fits that point, i.e., $P(Z_k|T_k,e)$. The idea is that if enough patches are selected then a reasonable coverage of the image is expected. In audio, two problems are faced. First, the spectrograms can be very long, thus requiring a very large number of patches before adequate coverage is achieved. Second, there is often a lot of redundancy in the data in terms of repeated sounds. A training procedure is required that takes advantage of this structure, as described infra.

Rather than selecting the patches randomly, one instance of the subject invention utilizes an informative patch sampling approach that aims to maximize coverage of the input spectrogram/melgram with as few patches as possible. The instances start with a uniform probability of selecting any patch and then updating the probability in every round based on the patches selected. Essentially, the patches similar to the patches selected so far are assigned a lower probability of selection. An example algorithm for an instance of the subject invention is illustrated as follows in TABLE 1:

TABLE 1

| INFORMATIVE PATCH SELECTION ALGORITHM |
|---|
| Initialize $P^i(k)$ to uniform probability for all positions k in the Spectrogram |
| For n = 1 to Num of Patches |
| Sample a position t from $p^n$. The selected patch: |
| $p^n$=spectrogram (: , t : t + patch_size) |
| For all positions k in the input spectrogram compute: |
| Err(k) = sum(spec(:, t : t + patch_size) − $p^n$) .^2 |
| $P^{n+1}(k) = P^n(k)$ * Err(k) |
| $p^{n+1}(k) = P^{n+1}(k) / \mathrm{sum}(P^{n+1}(k))$ |

Once the patches representative of the input audio signal are selected, the epitome can be trained. In one instance of the subject invention, all the patches utilized for training the epitome are of equal size (15 frames, or 0.25 seconds long). Note that in experiments, the audio is sampled at 16 kHz; utilizing an FFT frame size of 512 samples with an overlap of 256 samples, and 20 mel-frequency bins for the melgram. The EM algorithm was utilized to train epitomes as described in Jojic et al. Some instances of the subject invention differ from the technique in Jojic in that epitomic analysis is accomplished in only one dimension. Specifically, the patches utilized are always the full height of the spectrogram/melgram but of varying width, as opposed to the patches utilized in image epitomes in which both the width and the height are varied.

Figure 6:
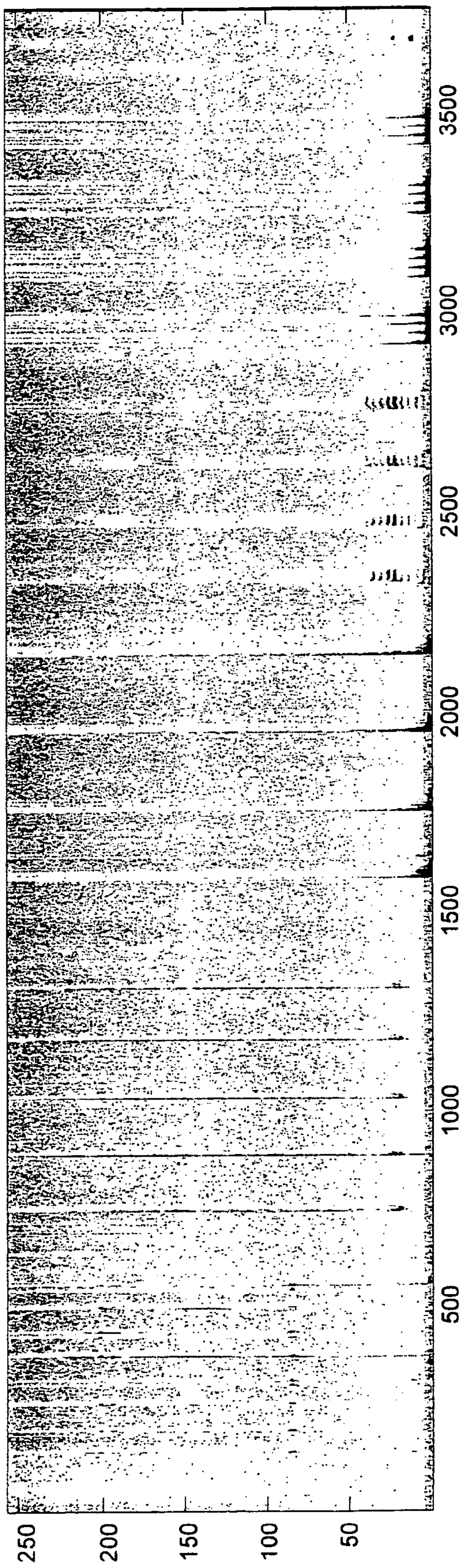
FIG. 6 is a graph illustrating a spectrogram of an input sequence with repeating sounds in accordance with an aspect of the subject invention.

Turning to FIG. 6, a graph illustrating a spectrogram 600 of an input sequence with repeating sounds in accordance with an aspect of the subject invention is shown. The spectrogram 600 depicts a sequence which exhibits the kind of repetition expected in natural sequences. It was collected in an office environment and consists of repeating sounds of different objects being hit, speech, etc. From the spectrogram 600, not only the repetition can be seen, but also a large amount of silence/background noise. If patches are randomly selected, mostly background patches will be left, and a substantial number will need to be selected before the whole spectrogram is covered.

Figure 7:
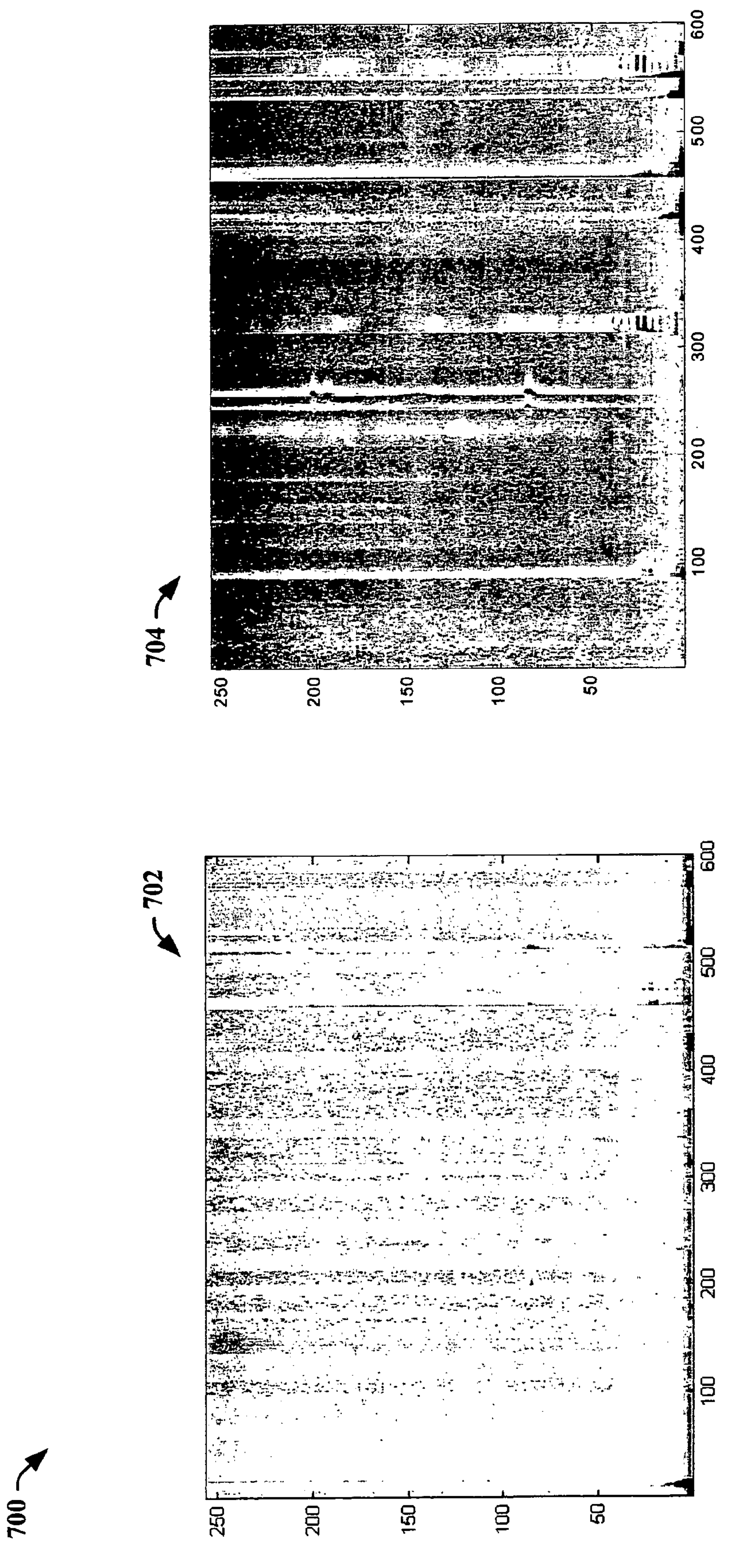
FIG. 7 is an illustration of graphs representing epitomes learned utilizing random and informative patch sampling in accordance with an aspect of the subject invention.

Looking at FIG. 7, an illustration of graphs 700 representing epitomes learned utilizing random 702 and informative patch sampling 704 in accordance with an aspect of the subject invention are shown. The graph 702 is the epitome generated utilizing random samples, and the graph 704 is the epitome generated utilizing the same number of patches but now utilizing an instance of the subject invention with an informative sampling scheme. Note that with this scheme, all of the individual sound elements from the input sequence have been captured, as opposed to the random sampling approach.

As shown, the learned epitome from an input sequence is a palette representing all the sound in that sequence. Now this representation is explored for utilization with classification. Since different classes are expected to be represented by patches from different parts of the epitome, the strategy is to look at the distribution of transformations $T_k$ given a class c of interest, i.e. $P(T_k|c,e)$, and utilize this to represent the class. A new patch can then be classified by looking at how its distribution compares to those of the target classes. In more detail, consider a series of examples from a target class that are desirable to detect, e.g. a bird chirp. First, all possible patches of length 1-15 frames are extracted. Next, look at the most likely transformations from the epitome corresponding to each patch extracted from the given audio, i.e., $\max_k P(T_k|c, e)$, are considered and then these are aggregated to form the histogram for $P(T_k|c,e)$.

Figure 8:
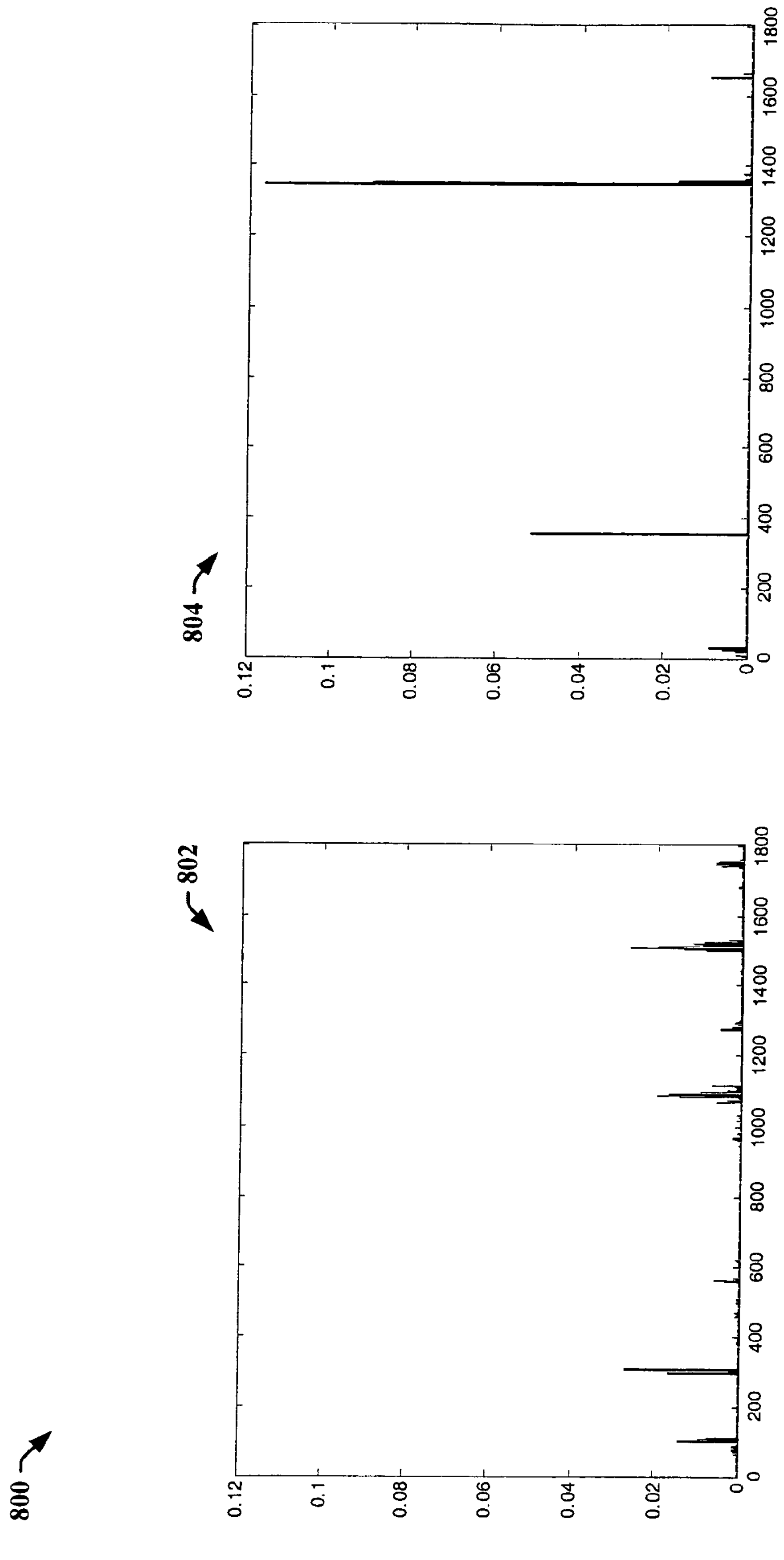
FIG. 8 is an illustration of graphs representing distributions over transformations T for bird chirps and cars in accordance with an aspect of the subject invention.

Turning to FIG. 8, an illustration of graphs representing distributions over transformations T for bird chirps 802 and cars 804 in accordance with an aspect of the subject invention are depicted. The graphs 802, 804 show two example classes, and the corresponding distributions $P(T_k|c,e)$. The graph 802 corresponds to bird chirps and, as the histogram suggests, most of the audio patches come from only four positions in the epitome. Note that this distribution is very different from the distribution that arises due to the acoustic event of cars passing by (graph 804). Note that these distributions can be learned utilizing very few examples for two reasons: first, many patches are generated from each example, and second, because the epitome has already compressed the input space into an optimal palette, an even smaller number of examples highlight the regions of the epitome that are assigned to explaining the class of interest.

Given a test audio segment to classify, $P(T_k|c,e)$ is first estimated utilizing all the patches of length 1-15 from the test segment. The class ĉ whose distribution best matches this sample distribution over all classes i in terms of the KL-divergence is then determined:

$$\hat{c} = \min_i D(P(T_k|c, e)\|P(T_k|c^i, e)) \qquad \text{(Eq. 2)}$$

Finally, though this framework has been utilized only to recognize individual sounds in the experiments, the method can also be utilized to model and recognize auditory environments via these distributions.

Figure 9:
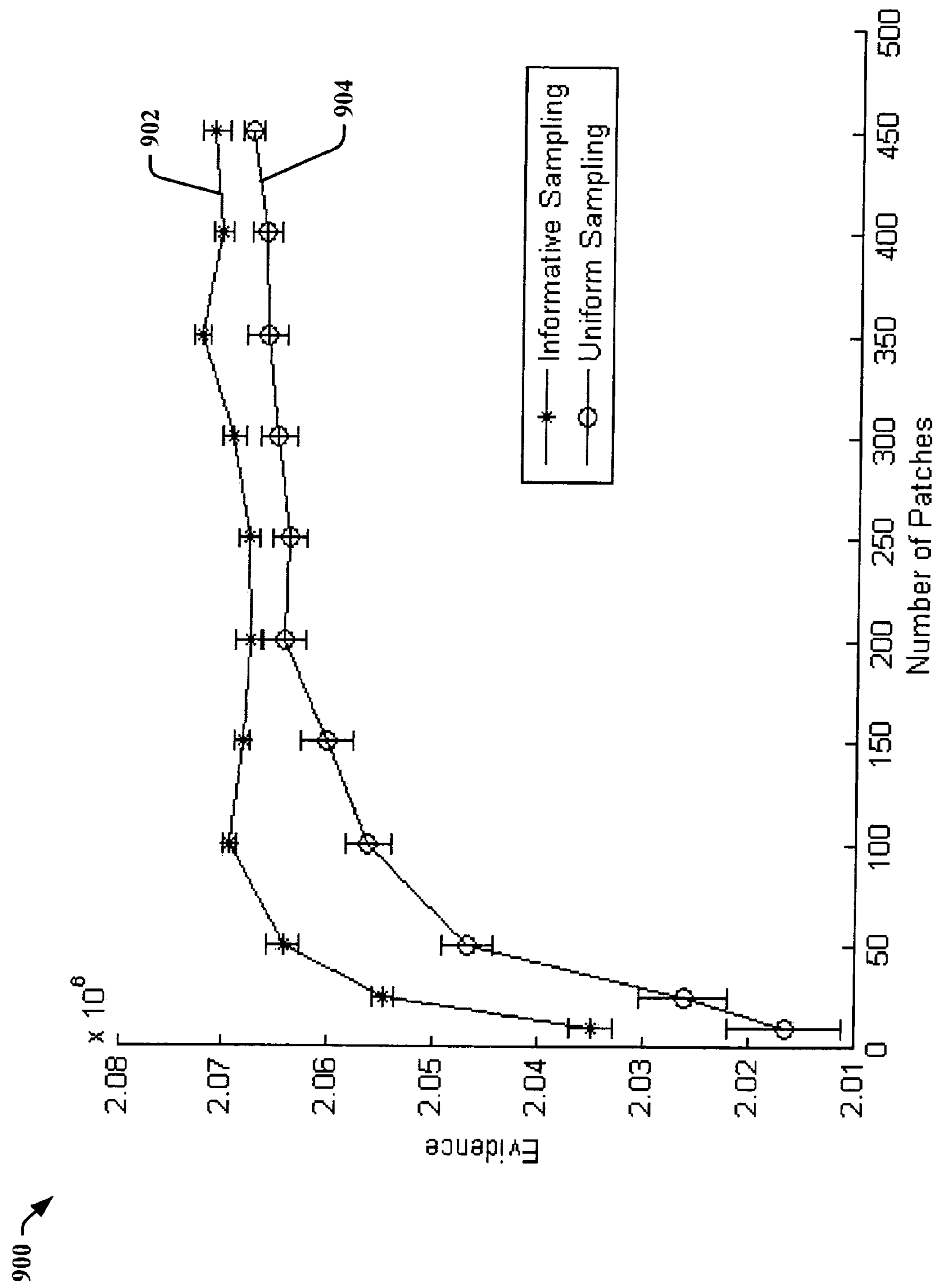
FIG. 9 is a graph illustrating evidence versus number of training patches in accordance with an aspect of the subject invention.

A set of experiments were performed to compare the epitomic training utilizing an instance of the subject invention that employs the informative patch selection with the training utilizing random patch selection. For these experiments, the spectrogram 600 shown in FIG. 6 was utilized. In FIG. 9, a graph 900 illustrating evidence versus number of training patches in accordance with an aspect of the subject invention is shown. The graph 900 compares the likelihood of the input spectrogram given the epitomes trained utilizing both the methods while varying the number of patches utilized for training. The higher likelihood corresponds to a better explanation of the input signal utilizing the epitome. The tests averaged over 10 runs for each point in the curve. It can be seen that the epitome utilizing the informative sampling 902 explains the input better than the epitome trained utilizing random sampling 904. The difference is more prominent when the number of patches is small. Naturally, as the number of patches goes to infinity, the curves will meet.

Figure 10:
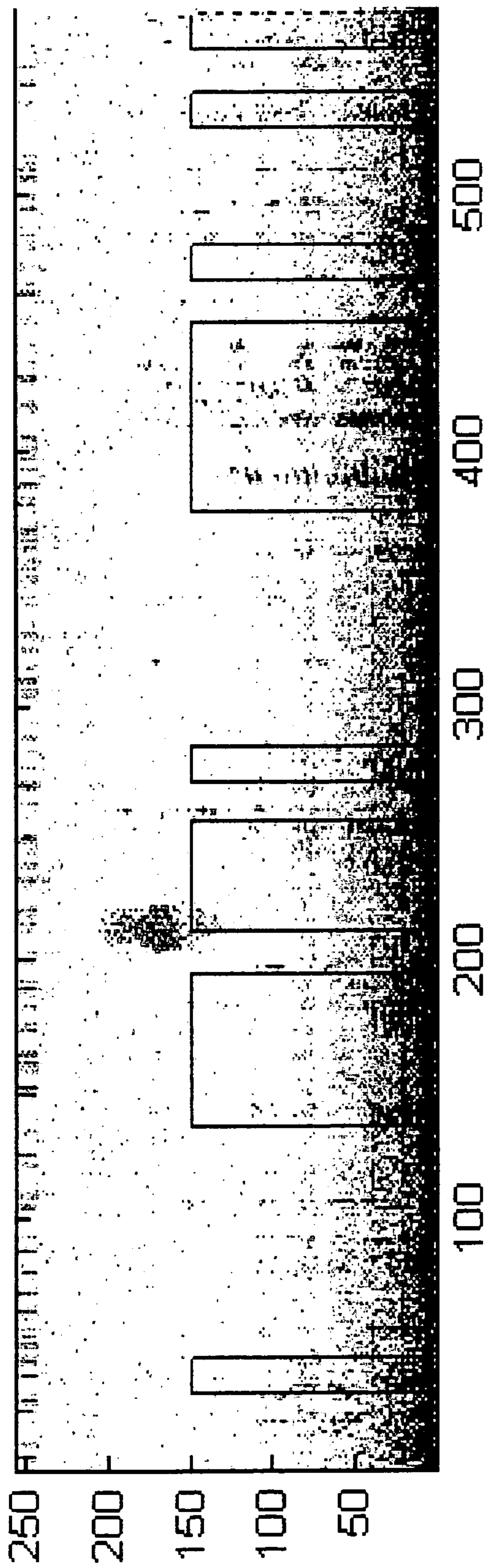
FIG. 10 is a graph illustrating a speech detection example in accordance with an aspect of the subject invention.

Next, speech detection is demonstrated on an outdoor sequence consisting of speech with significant background noise from nearby cars. A 1 minute long epitome was generated utilizing 8 minutes of data. The speech class was trained as described in supra utilizing only 5 labeled examples of speech. Referring to FIG. 10, a graph 1000 illustrating a speech detection example in accordance with an aspect of the subject invention is shown. The graph 1000 depicts the result of applying speech detection to a 10 second long audio sequence. The detector isolates speech segments from the non-speech segments from very significant noise (around −10 dB SSNR). Note that there is too much background noise for any intensity/frequency band based speech detector to work well.

As an additional evaluation, audio data was collected in three environments: a kitchen, parking lot, and a sidewalk along a busy street. On this data, the task of recognizing four different acoustic classes was attempted: speech, cars passing by, kitchen utensils, and bird chirps. The instance of the subject invention segmented 22 examples of speech, 17 examples of cars, 29 examples of utensil sounds, and 24 examples of bird-chirps. Furthermore, there were 30 audio segments that contained none of the mentioned acoustic classes. All sounds were in context, i.e., they were recurred in their natural environment with other background sounds occurring. This is in contrast to most of the prior work on sound classification, in which individual sounds were isolated and recorded in a studio. Examples of the sounds can be heard at http://research.microsoft.com/~sumitb/ae/ in the "Sound Samples" section. The log melgram was utilized as the feature space and compared the subject invention instance's approach with a nearest-neighbor (NN) classifier and a Gaussian Mixture Model (GMM) (both trained on individual feature frames; for the GMM the number of components were 1/10 the number of training frames, around 50 per class). For the non-epitome models, each frame was first classified using the NN or GMM, and then voting was utilized to decide the class-label for the segment. Note that training the epitome (which was utilized for all classes) took the same time as it took to train the GMM for each class. TABLE 2 compares the best performance obtained by each method utilizing 10 samples per class for training.

TABLE 2

CLASSIFIER PERFORMANCE COMPARISON

| | Epitome | | Nearest-N | | Mix of G | |
|---|---|---|---|---|---|---|
| | Pd | Pfa | Pd | Pfa | Pd | Pfa |
| Speech | 0.90 | 0.10 | 0.86 | 0.09 | 0.93 | 0.28 |
| Cars | 0.94 | 0.02 | 0.94 | 0.01 | 1.00 | 0.09 |
| Utensils | 0.94 | 0.12 | 0.84 | 0.21 | 0.82 | 0.31 |
| Bird Chirp | 0.79 | 0.31 | 0.94 | 0.11 | 0.89 | 0.05 |

Figure 11:
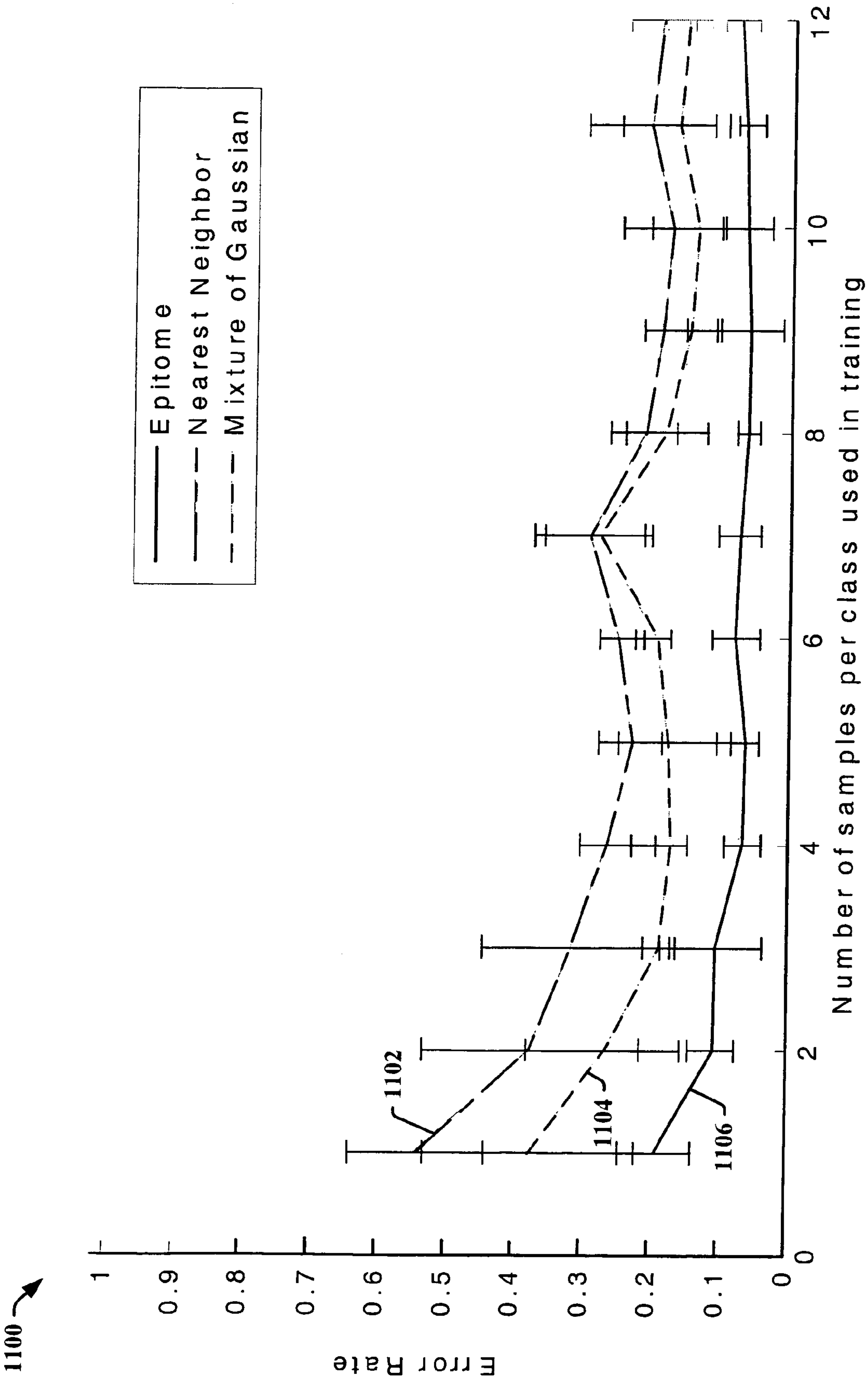
FIG. 11 is a graph illustrating performance versus number of training examples in accordance with an aspect of the subject invention.

These numbers were obtained by averaging over 25 runs with a random training/testing split on every run. The method provided by instances of the subject invention outperforms both the nearest neighbor and the mixture of Gaussian in 2 out of the 4 cases in this example. In one of the other two cases (cars), it is at least as good as the best performing method. In FIG. 11, a graph 1100 illustrating performance versus number of training examples in accordance with an aspect of the subject invention is shown. Finally, in the graph 1100, the performance with increasing training data is shown on the task of recognizing utensils. It can be once again seen that the classification utilizing an instance of the subject invention's epitome 1106 is significantly better than nearest neighbor 1102 and mixture of Gaussian 1104 in all cases except for the bird chirps, especially when the amount of training data is small. One skilled in the art can appreciate that instances of the subject invention can also be utilized to apply the framework to auditory environment classification and clustering. Thus, instances of the subject invention include more than just a novel representation for modeling audio and recognizing target classes based on the audio version of the epitome.

Other instances of the subject invention can be utilized for creating a "garbage model" for sound recognition. Since some instances of the subject invention seek to represent all sounds in a given environmental space, if one wants to recognize a particular sound, a palette-based model can provide an excellent "garbage model." In recognition problems, the garbage model is a model of everything other than the class of interest, which competes with a model of a particular class—if the model wins, then it is possible that the class of interest is present. For this to be effective, the garbage model needs to accurately represent everything else. Thus, instances of the subject invention provide the advantage of substantially modeling everything which is extremely difficult to accomplish with traditional methods.

Yet other instances of the subject invention can be utilized to provide a method for synthesizing sound objects/environments in three dimensions. Thus, instances can be employed in synthesizing (and learning) a spatial distribution of sounds, so that different sound elements can emanate from different locations in space. This is especially important, for example, for games, where the sound of an environment must reflect the physical placement of sound sources in that environment.

Figure 12:
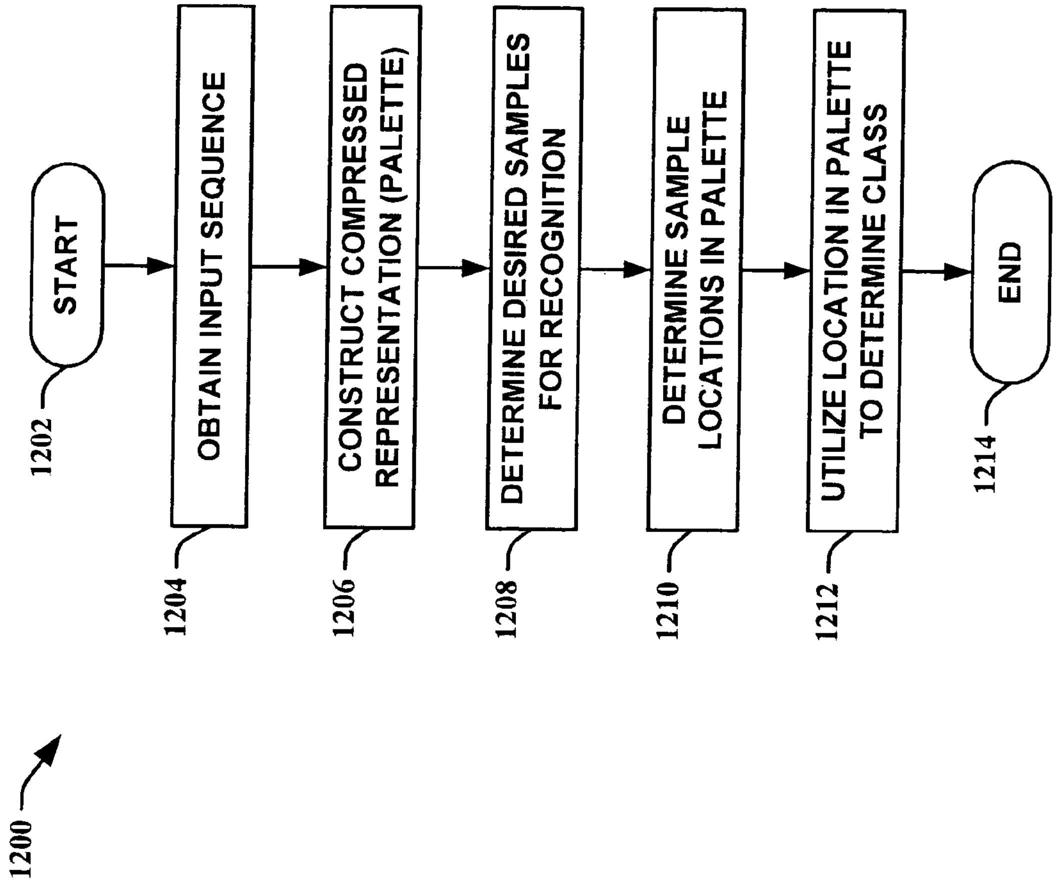
FIG. 12 is a flow diagram of a method of facilitating data recognition in accordance with an aspect of the subject invention.
Figure 13:
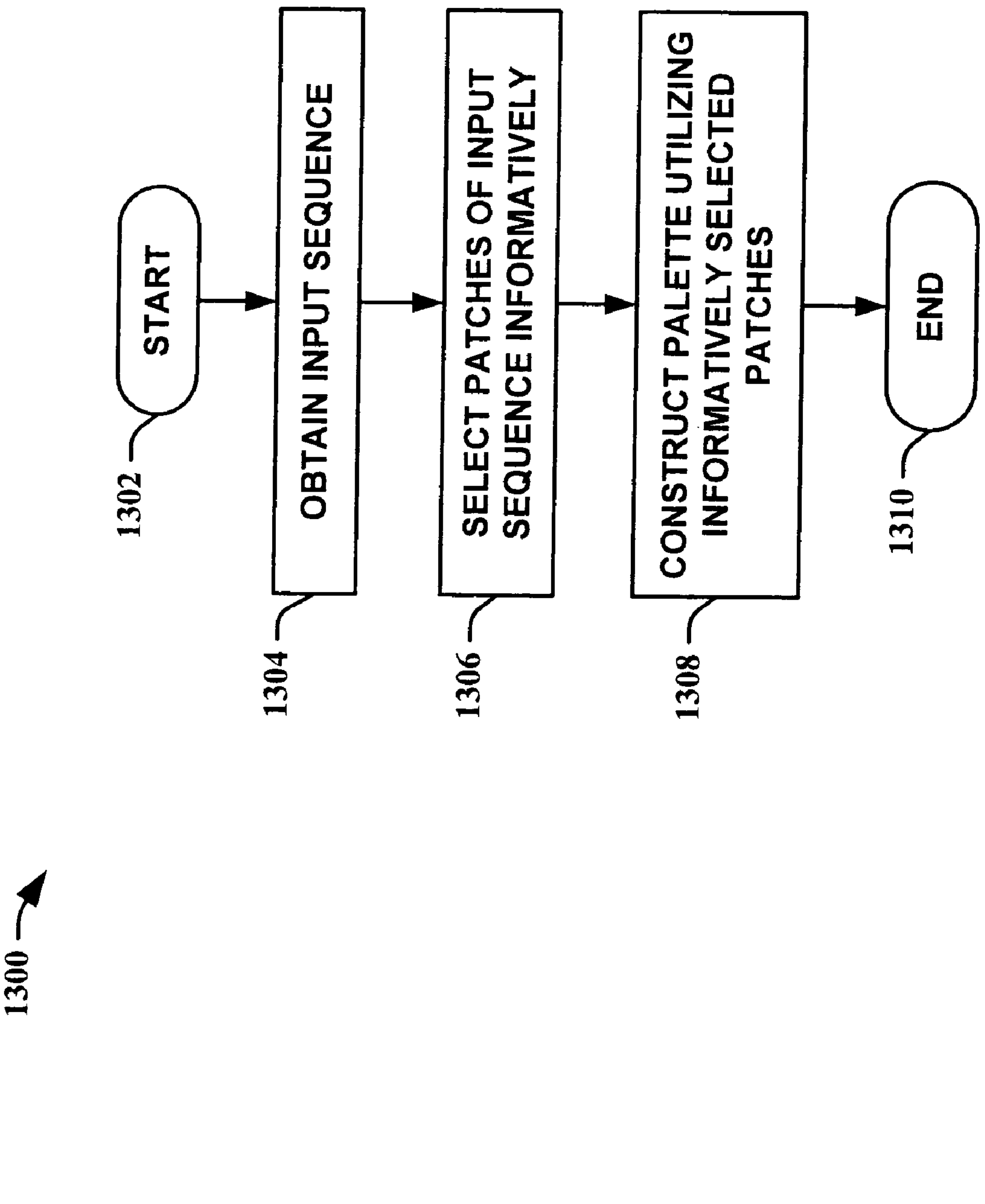
FIG. 13 is a flow diagram of a method of constructing a palette in accordance with an aspect of the subject invention.
Figure 14:
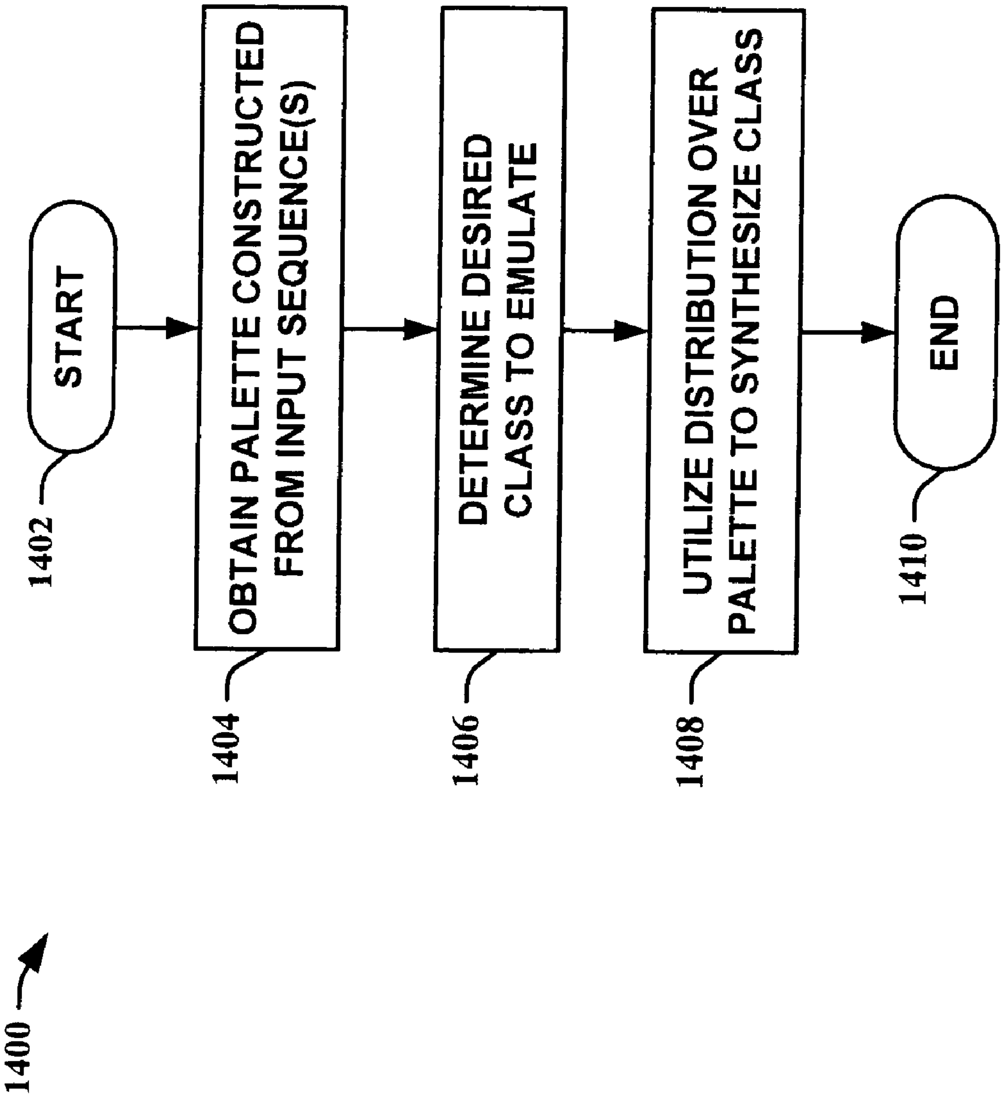
FIG. 14 is a flow diagram of a method of synthesizing a class in accordance with an aspect of the subject invention.

In view of the exemplary systems shown and described above, methodologies that may be implemented in accordance with the subject invention will be better appreciated with reference to the flow charts of FIGS. 12-14. While, for purposes of simplicity of explanation, the methodologies are shown and described as a series of blocks, it is to be understood and appreciated that the subject invention is not limited by the order of the blocks, as some blocks may, in accordance with the subject invention, occur in different orders and/or concurrently with other blocks from that shown and described herein. Moreover, not all illustrated blocks may be required to implement the methodologies in accordance with the subject invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the subject invention.

In FIG. 12, a flow diagram of a method 1200 of facilitating data recognition in accordance with an aspect of the subject invention is shown. The method 1200 starts 1202 by obtaining an input sequence 1204. The input sequence can include data from a variety of sources, including auditory and non-auditory data. A compressed representation or palette is then constructed from the input sequence 1206. Various techniques for constructing the palette can be employed as described supra. These techniques include, but are not limited to, epitome, vector quantization, and Huffman coding techniques and the like. The palette strives to present a representation that encompasses a substantial amount of relevant data from the input sequence. Samples are then selected from data that are desirable to classify/recognize 1208. These samples can include, for example, individual events, distributed events, and/or environments and the like. Once the desired samples are determined, the samples are located within the palette 1210. The palette locations are then utilized to classify/recognize the samples as being in a particular class 1212, ending the flow 1214.

Referring to FIG. 13, a flow diagram of a method 1300 of constructing a palette in accordance with an aspect of the subject invention is depicted. The method 1300 starts 1302 by obtaining an input sequence 1304. The input sequence can include data from a variety of sources, including auditory and non-auditory data. Selected patches of the input sequence are chosen informatively to reduce the computational overhead and increase the representative value of the patches 1306. A random approach can lead to a majority of the samples being representative of common data, losing any sudden or infrequent events that might occur within the input sequence. A palette is then constructed utilizing the informatively selected patches 1308, ending the flow 1310. The palette now has a substantially higher probability of representing most of the events that occur within the input sequence. This provides a better basis for utilizing the palette in determining classifications/recognitions.

Turning to FIG. 14, a flow diagram of a method 1400 of synthesizing a class in accordance with an aspect of the subject invention is illustrated. The method 1400 starts 1402 by obtaining a palette constructed from an input sequence 1404. A desired class (e.g., an environment, individual event, and/or distributed event) is selected to emulate 1406. A distribution over the palette is then performed to synthesize the desired class 1408, ending the flow 1410. In this manner, for example, a cafe environment can be recreated but with specific embellishments or with other events removed. So, a recorded environment that originally included only birds chirping and car sounds can be utilized to emulate an outdoor environment without the car sounds or with a dog barking by adding an additional event. By changing the class selections, an immense diversity of different environments can be synthesized.

Figure 15:
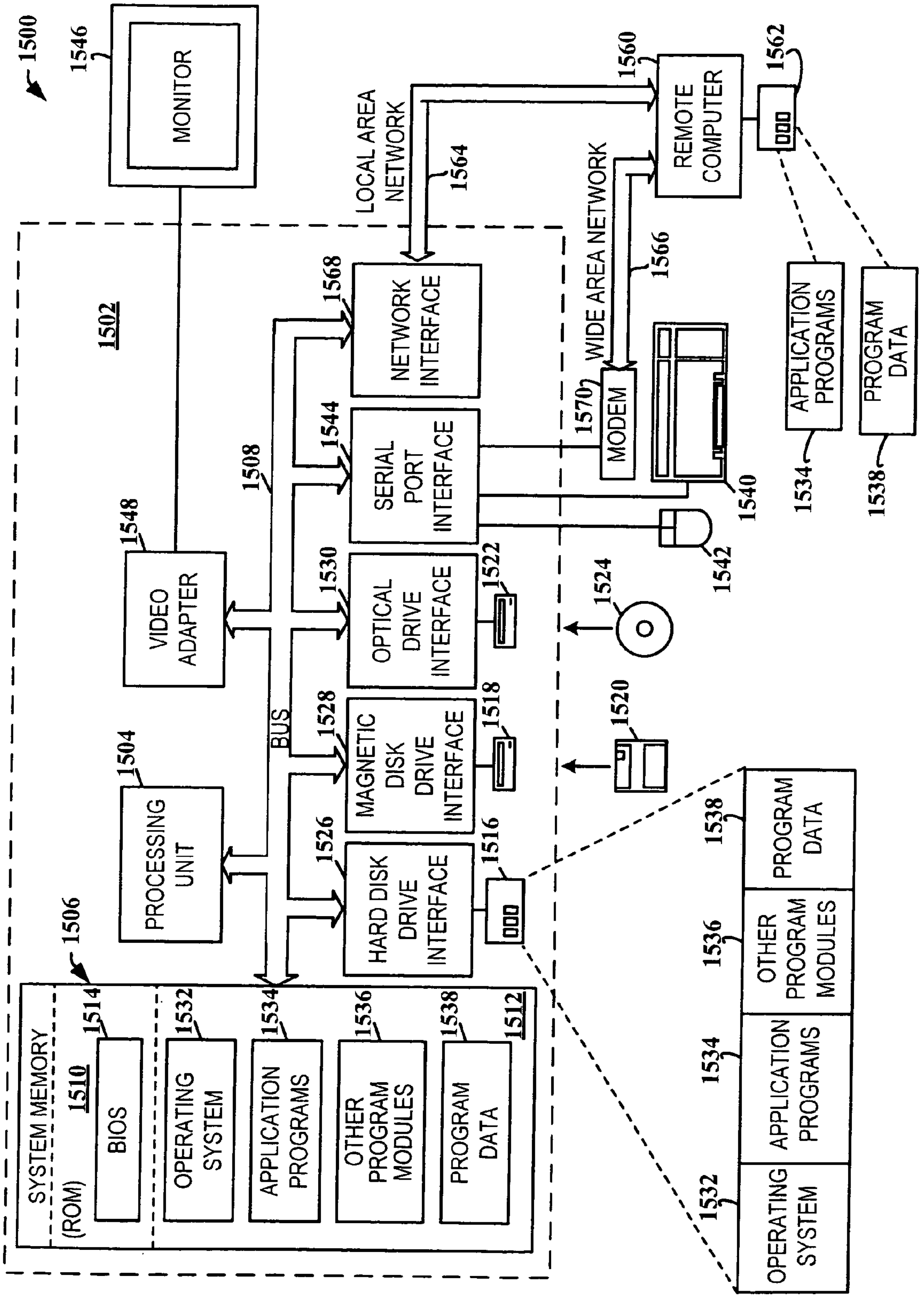
FIG. 15 illustrates an example operating environment in which the subject invention can function.

In order to provide additional context for implementing various aspects of the subject invention, FIG. 15 and the following discussion is intended to provide a brief, general description of a suitable computing environment 1500 in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 15, an exemplary system environment 1500 for implementing the various aspects of the invention includes a conventional computer 1502, including a processing unit 1504, a system memory 1506, and a system bus 1508 that couples various system components, including the system memory, to the processing unit 1504. The processing unit 1504 may be any commercially available or proprietary processor. In addition, the processing unit may be implemented as multi-processor formed of more than one processor, such as may be connected in parallel.

The system bus 1508 may be any of several types of bus structure including a memory bus or memory controller, a peripheral bus, and a local bus using any of a variety of conventional bus architectures such as PCI, VESA, Microchannel, ISA, and EISA, to name a few. The system memory 1506 includes read only memory (ROM) 1510 and random access memory (RAM) 1512. A basic input/output system (BIOS) 1514, containing the basic routines that help to transfer information between elements within the computer 1502, such as during start-up, is stored in ROM 1510.

The computer 1502 also may include, for example, a hard disk drive 1516, a magnetic disk drive 1518, e.g., to read from or write to a removable disk 1520, and an optical disk drive 1522, e.g., for reading from or writing to a CD-ROM disk 1524 or other optical media. The hard disk drive 1516, magnetic disk drive 1518, and optical disk drive 1522 are connected to the system bus 1508 by a hard disk drive interface 1526, a magnetic disk drive interface 1528, and an optical drive interface 1530, respectively. The drives 1516-1522 and their associated computer-readable media provide nonvolatile storage of data, data structures, computer-executable instructions, etc. for the computer 1502. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1500, and further that any such media may contain computer-executable instructions for performing the methods of the subject invention.

A number of program modules may be stored in the drives 1516-1522 and RAM 1512, including an operating system 1532, one or more application programs 1534, other program modules 1536, and program data 1538. The operating system 1532 may be any suitable operating system or combination of operating systems. By way of example, the application programs 1534 and program modules 1536 can include a data classification scheme in accordance with an aspect of the subject invention.

A user can enter commands and information into the computer 1502 through one or more user input devices, such as a keyboard 1540 and a pointing device (e.g., a mouse 1542). Other input devices (not shown) may include a microphone, a joystick, a game pad, a satellite dish, a wireless remote, a scanner, or the like. These and other input devices are often connected to the processing unit 1504 through a serial port interface 1544 that is coupled to the system bus 1508, but may be connected by other interfaces, such as a parallel port, a game port or a universal serial bus (USB). A monitor 1546 or other type of display device is also connected to the system bus 1508 via an interface, such as a video adapter 1548. In addition to the monitor 1546, the computer 1502 may include other peripheral output devices (not shown), such as speakers, printers, etc.

It is to be appreciated that the computer 1502 can operate in a networked environment using logical connections to one or more remote computers 1560. The remote computer 1560 may be a workstation, a server computer, a router, a peer device or other common network node, and typically includes many or all of the elements described relative to the computer 1502, although for purposes of brevity, only a memory storage device 1562 is illustrated in FIG. 15. The logical connections depicted in FIG. 15 can include a local area network (LAN) 1564 and a wide area network (WAN) 1566. Such networking environments are commonplace in offices, enterprise-wide computer networks, intranets and the Internet.

When used in a LAN networking environment, for example, the computer 1502 is connected to the local network 1564 through a network interface or adapter 1568. When used in a WAN networking environment, the computer 1502 typically includes a modem (e.g., telephone, DSL, cable, etc.) 1570, or is connected to a communications server on the LAN, or has other means for establishing communications over the WAN 1566, such as the Internet. The modem 1570, which can be internal or external relative to the computer 1502, is connected to the system bus 1508 via the serial port interface 1544. In a networked environment, program modules (including application programs 1534) and/or program data 1538 can be stored in the remote memory storage device 1562. It will be appreciated that the network connections shown are exemplary and other means (e.g., wired or wireless) of establishing a communications link between the computers 1502 and 1560 can be used when carrying out an aspect of the subject invention.

In accordance with the practices of persons skilled in the art of computer programming, the subject invention has been described with reference to acts and symbolic representations of operations that are performed by a computer, such as the computer 1502 or remote computer 1560, unless otherwise indicated. Such acts and operations are sometimes referred to as being computer-executed. It will be appreciated that the acts and symbolically represented operations include the manipulation by the processing unit 1504 of electrical signals representing data bits which causes a resulting transformation or reduction of the electrical signal representation, and the maintenance of data bits at memory locations in the memory system (including the system memory 1506, hard drive 1516, floppy disks 1520, CD-ROM 1524, and remote memory 1562) to thereby reconfigure or otherwise alter the computer system's operation, as well as other processing of signals. The memory locations where such data bits are maintained are physical locations that have particular electrical, magnetic, or optical properties corresponding to the data bits.

Figure 16:
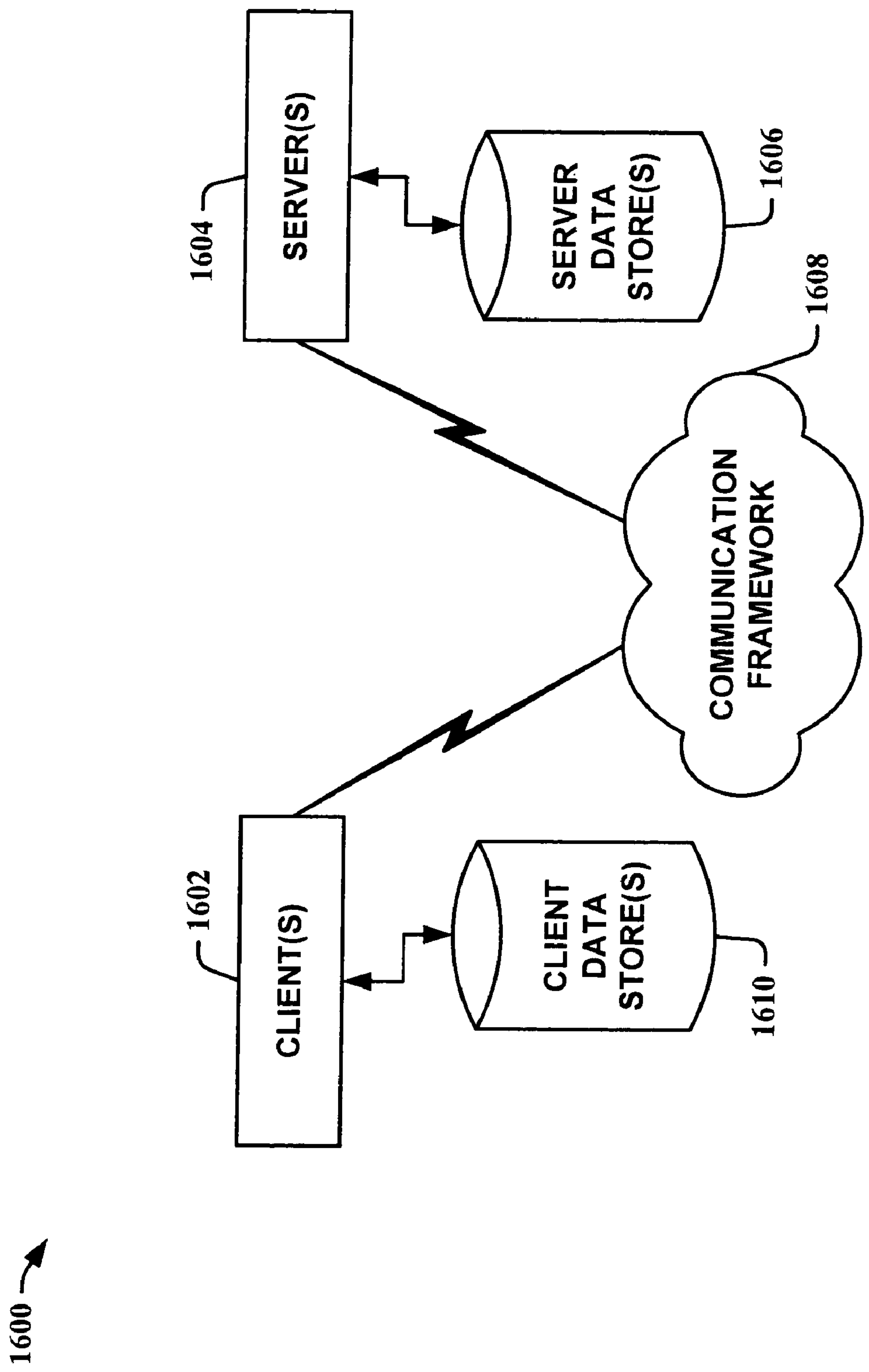
FIG. 16 illustrates another example operating environment in which the subject invention can function.

FIG. 16 is another block diagram of a sample computing environment 1600 with which the subject invention can interact. The system 1600 further illustrates a system that includes one or more client(s) 1602. The client(s) 1602 can be hardware and/or software (e.g., threads, processes, computing devices). The system 1600 also includes one or more server(s) 1604. The server(s) 1604 can also be hardware and/or software (e.g., threads, processes, computing devices). One possible communication between a client 1602 and a server 1604 may be in the form of a data packet adapted to be transmitted between two or more computer processes. The system 1600 includes a communication framework 1608 that can be employed to facilitate communications between the client(s) 1602 and the server(s) 1604. The client(s) 1602 are connected to one or more client data store(s) 1610 that can be employed to store information local to the client(s) 1602. Similarly, the server(s) 1604 are connected to one or more server data store(s) 1606 that can be employed to store information local to the server(s) 1604.

In one instance of the subject invention, a data packet transmitted between two or more computer components that facilitates data recognition is comprised of, at least in part, information relating to an audio recognition system that utilizes, at least in part, an audio epitome to facilitate in recognition of audio sounds and/or environments.

It is to be appreciated that the systems and/or methods of the subject invention can be utilized in data classification facilitating computer components and non-computer related components alike. Further, those skilled in the art will recognize that the systems and/or methods of the subject invention are employable in a vast array of electronic related technologies, including, but not limited to, computers, servers and/or handheld electronic devices, and the like.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates audio data recognition, comprising:

an input sequence receiving component that receives at least one input sequence having individual events, the input sequence comprising an audio environment input, the individual events comprising individual sounds of the audio environment input;

a representation component that employs an epitome to facilitate in constructing and representing a compressed representation of the input sequence that utilizes informative patch sampling to minimize a number of patches employed and attempts to provide maximal coverage of the individual events within the input sequence, the compressed representation comprising a discrete or continuous palette comprising a palette of sounds;

wherein the epitome is trained by selecting an informed patch sampling from a training spectrogram, the informed patch sampling selected using an algorithm comprising:

initializing $P^i(k)$ to uniform probability for all positions k in the training spectrogram;

for n=1 where n is the number of patches, sampling a position t from $P^n$, where:

$P^n$=spectrogram (: , t: t+patch_size); and for all positions k in the training spectrogram compute:

Err(k)=sum(spec(:, t: t+patch_size)−$P^n$)^2;

$P^{n+1}(k)=P^n(k)$*Err(k); and $P^{n+1}(k)=P^{n+1}(k)/\mathrm{sum}(P^{n+1}(k))$;

averaging each patch of the informed patch sampling to all possible offsets, $T_k$, in the epitome weighted to the probability of observing an input sequence, $Z_k$, given the current iteration of the epitome and particular offset ($T_k$) as a product of Gaussians over individual frequency-time values as:

$$P(Z_k \mid T_k, e) = \prod_{i \in S_k} N(z_{j,k}; \mu_{T_k(i)}, \phi_{T_k(i)}),$$

where the i's are for the iteration over the individual frequency-time values of the training spectrogram; and a recognition component that utilizes, at least in part, the palette to construct a plurality of classifiers that facilitate recognition of a plurality of different classes in the audio environment input.

2. The system of claim 1, wherein at least one class comprises an environment, an individual event, or a distribution of events.

3. The system of claim 1, wherein at least one classifier is utilized to recognize individual audio sounds or audio environments.

4. A garbage modeling component that utilizes the system of claim 1 to construct a garbage model for employment in determining the likelihood of an existence of an individual event.

5. The system of claim 1 further comprising:

a synthesizing component that utilizes the palette to synthesize individual events, distributions of events, or environments.

6. The system of claim 1, the individual events, distributions of events, or environments comprising spatially distributed individual events, distributions of events, or environments, respectively.

7. A method for facilitating audio data recognition, comprising:

receiving at least one input sequence; the input sequence having at least one individual event;

employing a trained epitome to facilitate in constructing and representing a compressed representation of the input sequence that utilizes informative patch sampling to minimize a number of patches employed and attempts to provide maximal coverage of the individual events within the input sequence; the compressed representation comprising a discrete or continuous palette;

wherein the epitome is trained by selecting an informed patch sampling from a training spectrogram, the informed patch sampling selected using an algorithm comprising:

initializing $P^i(k)$ to uniform probability for all positions k in the training spectrogram;

for n=1 where n is the number of patches, sampling a position t from $P^n$, where:

$P^n$=spectrogram (: , t: t+patch_size); and for all positions k in the training spectrogram compute:

Err(k)=sum(spec(:, t: t+patch_size)−$P^n$)^2;

$P^{n+1}$(k)=$P^n$(k)*Err(k); and $P^{n+1}$(k)=$P^{n+1}$(k)/sum($P^{n+1}$(k));

averaging each patch of the informed patch sampling to all possible offsets, $T_k$, in the epitome weighted to the probability of observing an input sequence, $Z_k$, given the current iteration of the epitome and particular offset ($T_k$) as a product of Gaussians over individual frequency-time values as:

$$P(Z_k \mid T_k, e) = \prod_{i \in S_k} N(z_{j,k}; \mu_{T_k(i)}, \phi_{T_k(i)}),$$

where the i's are for the iteration over the individual frequency-time values of the training spectrogram; and utilizing, at least in part, the palette to construct a plurality of classifiers that facilitate recognition of a plurality of different classes in the input sequence, at least one class comprising an environment, an individual event, or a distribution of events.

8. The method of claim 7 further comprising:

utilizing vector quantization, or Huffman coding technique to facilitate construction of the palette.

9. The method of claim 7, the input sequence comprising an audio environment input, the individual events comprising individual sounds of the audio environment input, and the palette comprising a palette of sounds.

10. The method of claim 7 further comprising:

utilizing the classifier to facilitate in recognizing individual audio sounds or audio environments.

11. A garbage modeling component that utilizes the method of claim 7 to construct a garbage model for employment in determining the likelihood of an existence of an individual event.

12. The method of claim 7 further comprising:

utilizing the palette to synthesize individual events, distributions of events, or environments.

13. The method of claim 7, the individual events, distributions of events, or environments comprising spatially distributed individual events, distributions of events, or environments, respectively.

14. A system that facilitates audio data recognition, comprising:

means for receiving at least one input sequence having individual events, the input sequence comprising an audio environment input, the individual events comprising individual sounds of the audio environment input;

means for employing a trained epitome to facilitate in constructing and representing constructing a compressed representation of the input sequence that utilizes informative patch sampling to minimize a number of patches employed and attempts to provide maximal coverage of the individual events within the input sequence; the compressed representation comprising a discrete or continuous palette;

wherein the epitome is trained by selecting an informed patch sampling from a training spectrogram, the informed patch sampling selected using an algorithm comprising:

initializing $P^i(k)$ to uniform probability for all positions k in the training spectrogram;

for n=1 where n is the number of patches, sampling a position t from $P^n$, where:

$P^n$=spectrogram (: , t: t+patch_size); and for all positions k in the training spectrogram compute:

Err(k)=sum(spec(:, t: t+patch_size)−$P^n$)^2;

$P^{n+1}$(k)=$P^n$(k)*Err(k); and $P^{n+1}$(k)=$P^{n+1}$(k)/sum($P^{n+1}$(k));

averaging each patch of the informed patch sampling to all possible offsets, $T_k$, in the epitome weighted to the probability of observing an input sequence, $Z_k$, given the current iteration of the epitome and particular offset ($T_k$) as a product of Gaussians over individual frequency-time values as:

$$P(Z_k \mid T_k, e) = \prod_{i \in S_k} N(z_{j,k}; \mu_{T_k(i)}, \phi_{T_k(i)}),$$

where the i's are for the iteration over the individual frequency-time values of the training spectrogram; and means for utilizing, at least in part, the palette to construct a plurality of classifiers that facilitate recognition of a plurality of different classes in the input sequence.

15. A system that facilitates speech recognition, comprising:

a processor communicatively coupled to a memory having stored thereon an audio receiving component that receives at least one audio sequence; the audio sequence having at least one individual speech component;

a representation component employing a trained audio epitome to facilitate in constructing and representing a compressed representation of the audio sequence that attempts to provide maximal coverage of the individual speech events within the audio sequence; the compressed representation comprising a discrete or continuous audio palette of informatively chosen patches of the audio environment;

wherein the audio epitome is trained by selecting an informed patch sampling from a training spectrogram, the informed patch sampling selected using an algorithm comprising:

initializing $P^i(k)$ to uniform probability for all positions k in the training spectrogram;

for n=1 where n is the number of patches, sampling a position t from $P^n$, where:

$P^n$=spectrogram (: , t: t+patch_size); and for all positions k in the training spectrogram compute:

Err(k)=sum(spec(:, t: t+patch_size)−$P^n$)^2;

$P^{n+1}$(k)=$P^n$(k)*Err(k); and $P^{n+1}$(k)=$P^{n+1}$(k)/sum($P^{n+1}$(k));

averaging each patch of the informed patch sampling to all possible offsets, $T_k$, in the epitome weighted to the probability of observing an input sequence, $Z_k$, given the current iteration of the epitome and particular offset ($T_k$) as a product of Gaussians over individual frequency-time values as:

$$P(Z_k \mid T_k, e) = \prod_{i \in S_k} N(z_{j,k}; \mu_{T_k(i)}, \phi_{T_k(i)}),$$

where the i's are for the iteration over the individual frequency-time values of the training spectrogram; and a recognition component that utilizes, at least in part, the audio palette to construct a plurality of classifiers that facilitate recognition or generation of an individual speech event, or a distribution of speech events.

16. The system of claim 15, further comprising:

a video receiving component that receives at least one video sequence; the video sequence having at least one individual image component related to the individual speech component; and a representation component that constructs a compressed representation of the video sequence that attempts to provide maximal coverage of the individual speech events within the video sequence; the compressed representation comprising a discrete or continuous video palette.

* * * * *